United States Patent [19]

Nakano et al.

[11] Patent Number: 5,226,157
[45] Date of Patent: Jul. 6, 1993

[54] BACKUP CONTROL METHOD AND SYSTEM IN DATA PROCESSING SYSTEM USING IDENTIFIERS FOR CONTROLLING BLOCK DATA TRANSFER

[75] Inventors: Toshio Nakano; Masafumi Nozawa; Akira Kurano; Kiyoshi Hisano; Masayuki Hoshino, all of Odawara, Japan

[73] Assignee: Hitachi, Ltd., Tokyo, Japan

[21] Appl. No.: 318,006

[22] Filed: Mar. 2, 1989

[30] Foreign Application Priority Data

Mar. 11, 1988 [JP] Japan ................................. 63-56024

[51] Int. Cl.⁵ ............................................. G06F 15/40
[52] U.S. Cl. ................................. 395/600; 364/282.1; 364/268.5; 364/268; 364/268.3; 364/DIG. 2
[58] Field of Search ... 364/200 MS File, 900 MS File, 364/134; 395/600

[56] References Cited

U.S. PATENT DOCUMENTS

| | | | |
|---|---|---|---|
| 4,077,059 | 2/1978 | Cordi | 364/200 |
| 4,169,289 | 9/1979 | Hogan | 364/200 |
| 4,262,332 | 4/1981 | Bass | 364/200 |
| 4,420,807 | 12/1983 | Nolta | 364/200 |
| 4,429,363 | 1/1984 | Duke | 364/200 |
| 4,439,829 | 3/1984 | Tsiang | 364/200 |
| 4,467,421 | 8/1984 | White | 364/200 |
| 4,489,381 | 12/1984 | Lavallee | 364/200 |
| 4,638,424 | 1/1987 | Beglin | 364/200 |
| 4,755,928 | 7/1988 | Johnson | 364/200 |
| 4,771,375 | 9/1988 | Belgin | 364/200 |
| 4,800,483 | 1/1989 | Yamamoto | 364/200 |
| 4,901,228 | 2/1990 | Kodama | 364/200 |

FOREIGN PATENT DOCUMENTS 8501279 7/1985 PCT Int'l Appl. .

OTHER PUBLICATIONS

Database Backup and Recovery in Transaction Driven Information Systems by John Kauntz IEEE 1985 Intl. Conf. on Super Computing Sys.

Primary Examiner—Thomas C. Lee
Assistant Examiner—Eric Coleman
Attorney, Agent, or Firm—Antonelli, Terry, Stout & Kraus

[57] ABSTRACT

In a data processing system having a first external memory, a second external memory, and a control memory for storing information on data renewals in the first external memory, a system and a method provide for back-up operations in parallel with ordinary data processing, including dump processing in which renewed data parts in the first external memory are copied as backup data into the second external memory with reference to the contents of the control memory. The method provides the step of storing into the control memory first identifier information for identifying areas of the first external memory where data items were renewed; the step of storing into the control memory second identifier information for identifying areas of the first external memory where data items were renewed during the dump processing; and the step of erasing at completion of the dump processing the first identifier information items except those which identify the same areas as identified by the second identifier information items. Thus, ordinary job processing and the renewals of the data items of the first external memory can be performed even in the course of the data dumping processing.

14 Claims, 5 Drawing Sheets

FIG. 2

| CYLINDER NO. | RENEWAL A | RENEWAL B |
|---|---|---|
| ⋮ | ⋮ | ⋮ |
| ⋮ | ⋮ | ⋮ |
| 721 | | |
| 722 | 1 | |
| 723 | 1 | 1 |
| 724 | | |
| 725 | 1 | |
| 726 | | |
| 727 | | |
| 728 | 1 | 1 |
| 729 | | |
| 730 | 1 | |
| 731 | 1 | |
| 732 | | |
| 733 | | |
| 734 | | |
| 735 | 1 | 1 |
| 736 | | |
| ⋮ | ⋮ | ⋮ |
| ⋮ | ⋮ | ⋮ |
| ⋮ | ⋮ | ⋮ |

BACKUP CONTROL METHOD AND SYSTEM IN DATA PROCESSING SYSTEM USING IDENTIFIERS FOR CONTROLLING BLOCK DATA TRANSFER

BACKGROUND OF THE INVENTION

The present invention relates to a backup control method and system for an external memory in a data processing system. More particularly, it relates to a method and system for copying data for the backup of an external memory onto another storage medium.

In a data processing system which includes a central processing unit (CPU) and an external memory, for example, a magnetic disk device, data stored in the external memory is used for data processing by the CPU, and it is renewed or modified according to the result of the data processing. Meanwhile, there is always the fear that such data in the external memory will be destroyed by failure of the hardware, an error in the program, an error in the operation, the mischief of a hacker, or any other unexpected situation. In order to recover the data thus destroyed, it is common practice nowadays to copy or dump the contents of the external memory onto another storage medium, for example, a magnetic tape device at suitable time intervals.

The simplest dumping method is to dump all the contents of the external memory, such as a magnetic disk device, into the magnetic tape device or the like periodically. With this method, however, the period of time for which ordinary data processing is suspended due to the dump processing is long, and besides, a storage medium having a large storage capacity is required for storing the dumped data. To the end of eliminating these difficulties, in a system disclosed in the official gazette of Japanese Patent Application Laid-open No. 90770/1982, a disk control device records information items indicative of the positions (for example, tracks) of renewed or modified data blocks in a control memory, a CPU reads out the contents of the control memory and dumps only the renewed data blocks into a magnetic tape device after all jobs have been executed, and the CPU resets the control memory when the dumping has ended. Using the renewed data blocks thus obtained and all data items previously dumped, data can be recovered.

The aforementioned system disclosed in the official gazette has the merit that the period of time and the capacity of the storage medium as required for the dumping are remarkably shortened and reduced. However, no job can be processed until the dumping ends. The reason is that, if data is renewed in the course of the dumping, the renewal might be missed, so the renewed data might not be dumped. By way of example, in a case where data on a certain track is renewed immediately after data on the same track has been dumped, the record of the data renewal is erased by the reset operation at the end of the dumping. Meanwhile, 24-hour operations with no cessation are often required of computer systems in computing centers and computer systems for various sorts of on-line processing. For such a computer system, it is very unfavorable to stop the ordinary job processing for a considerable time interval on account of the dump processing.

SUMMARY OF THE INVENTION

It is accordingly the principal object of the present invention to provide a backup control method and system in which renewed data blocks are dumped without stopping ordinary job processing.

Another object of the present invention is to provide a backup control method and system in which ordinary job processing and data dump processing are executed in parallel.

Besides, in such dump processing in the prior art, perfect backup data cannot be obtained in a case where the records of the positions of the renewed data blocks are reset when the dumping is suspended due to the cancellation thereof or the breakdown of the system or in a case where they are lost by the service interruption of power supply.

It is accordingly another object of the present invention to prevent the erroneous resetting and disappearance of the data renewal records as stated above, thereby to enhance the reliability of backup based on the dumping of only renewed data parts.

In the present invention, besides first identifier information which identifies each area subjected to data renewal for every point in time, second identifier information which identifies each area subjected to data renewal during dump processing is especially stored in a control memory. In resetting the control memory at the end of the dump processing, the first identifier information which identifies the same area as identified by the second identifier information is left behind without being erased.

By way of example, the first identifier information and the second identifier information are respectively recorded as the flag values of a first bit and a second bit at that location of the control memory which corresponds to the area of an external memory subjected to the data renewal. The first bit is set to "1" when the data renewal has been done in the corresponding area of the external memory, while the second bit is set to "1" in a case where the renewal has occurred during the dump processing. If the second bit is "1", the resetting of the first bit at the end of the dump processing is inhibited. In the dump processing, the data of the area identified by the first identifier information (the first bit) is dumped.

The first identifier information should preferably be erased after acknowledging the end of the dump processing, and upon awaiting a command from a host device which supervises the dump processing, for example, a CPU or an input/output control unit. In addition, the control memory which stores the first identifier information and the second identifier information therein should desirably be nonvolatile.

The second identifier information which indicates the execution of the data renewal during the dump processing is stored, and the resetting of the first identifier information is controlled by the use of the second identifier information, whereby data renewed during the dump processing is held in a non-dumped state and is added to the subject of next dump processing. Accordingly, even when data is renewed during the dump processing, no hindrance arises. In other words, only renewed data parts are permitted to be dumped without omission in parallel with ordinary data processing or in the intervals thereof.

The fact that the erasure of the first identifier information is done upon awaiting the command from the host device, prevents the first identifier information from being destroyed by the suspension of the dump processing attributed to the cancellation of the dump processing, the breakdown of a system, or the like.

After such suspension, the dump processing is simply executed again in accordance with the conserved first identifier information, whereby all the renewed data parts can be obtained correctly. Moreover, the adoption of the nonvolatile control memory prevents the information items indicative of the positions of the renewed data from being lost by the service interruption of power supply, thereby to improve the reliability of a backup system which dumps only the renewed data.

BRIEF DESCRIPTION OF THE DRAWINGS

FIG. 2 is a diagram showing an example of a renewed cylinder management table for use in the embodiment of FIG. 1;

DESCRIPTION OF THE PREFERRED EMBODIMENTS

Figure 1:
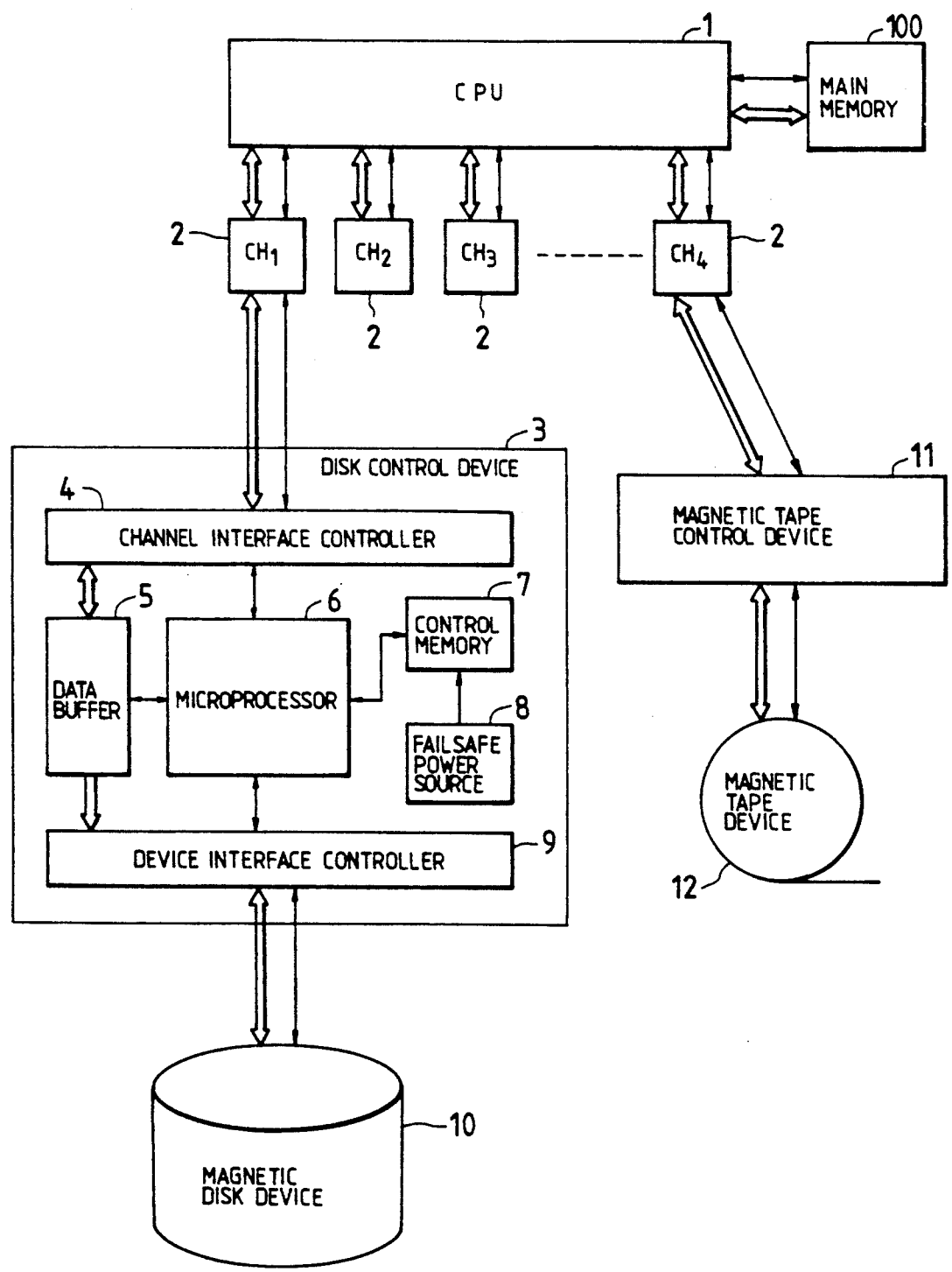
FIG. 1 is a block diagram showing a backup system in an embodiment of the present invention.

FIG. 1 shows a data backup system according to an embodiment of the present invention. A central processing unit (CPU) 1 is connected to a main memory 100 for storing data, and is connected to an input/output unit and an external memory through a plurality of channels (CH) 2. In the illustrated example, the CPU 1 is connected to a disk control device 3 through a certain channel $CH_1$ and to a magnetic tape control device 11 through another channel $CH_4$. The disk control device 3 is subsequently connected to a magnetic disk device 10, while the magnetic tape control device 11 is subsequently connected to a magnetic tape device 12. Incidentally, although omitted from the illustrated system, actually a plurality of magnetic disk devices 10 are sometimes connected to the disk control device 3, and disk control devices 3 similarly constructed or a printer, a display unit, etc. being known are sometimes connected to the other channels $CH_2$ and $CH_3$. Further, a plurality of magnetic tape devices 12 are sometimes connected to the magnetic tape control device 11 through a plurality of adapters.

In the figure, single-line arrows denote lines for transmitting control signals, and double-line arrows denote data transfer paths.

The disk control device 3 includes a channel interface controller 4 which exchanges signals between this disk control device 3 and the corresponding channel 2; a data buffer 5 in which data to be transferred between the CPU 1 and the magnetic disk device 10 is temporarily stored; a microprocessor 6 which controls this disk control device 3; a control memory 7 which stores therein the programs of the microprocessor 6, a renewed cylinder management table to be described later, and other control information items; a failsafe power source 8 which serves the control memory 7; and a device interface controller 9 which exchanges signals between this disk control device 3 and the magnetic disk device 10. In this embodiment, a semiconductor memory is employed as the control memory 7, and the failsafe power source 8 is provided in order to render the semiconductor control memory nonvolatile. More specifically, the failsafe power source 8 has a battery and maintains the feed of electric power to the control memory 7 even when the main power supply of the disk control device 3 is out of order, whereby the control information, especially the data of the renewed cylinder management table, is prevented from disappearing due to failure of the power supply.

In this embodiment, data to be dumped is managed in, for example, cylinder unit. FIG. 2 shows an example of the renewed cylinder management table which is held in the control memory 7. The renewed cylinder management table 20 contains cylinder No. fields 21 which bear the identification Nos. of all cylinders, renewal A fields 22 in which each cylinder is expressed by 1 bit, and renewal B fields 23 in which each cylinder is expressed by 1 bit. When data on a track belonging to a certain cylinder is renewed, "1" is written into both the corresponding renewal A field 22 and renewal B field 23. At the start of the dumping, all the renewal B fields 23 are reset. On the other hand, at the completion of the dumping, the renewal A fields 22 are reset except those for which the associated renewal B fields 23 bear "1". Accordingly, the bit value "1" of the renewal A field 22 signifies that data on the corresponding cylinder has been renewed and needs to be dumped, and the bit value "1" of the renewal B field 23 signifies that the renewal indicated by the associated renewal A field arose after the start time of the latest dumping. FIG. 2 exemplifies the contents of the renewed cylinder management table at a certain point of time after the start of dumping and before the completion thereof. For example, a cylinder 722 was renewed before the start of current dump processing, and a cylinder 723 was renewed before the start of the current dump processing and was also renewed after the start of the current dump processing.

The operations of writing and reading data into and from the magnetic disk device 10 and the operation of dumping data are started by instructions issued from the CPU 1 to the channel 2. The channel 2 having received the instructions sends required commands to the disk control device 3 and occasionally to the magnetic tape control device 11 so as to execute the instructed operations.

In the write operation, the CPU 1 issues an input/output start instruction to the channel $CH_1$ and designates a channel program (for example, channel command word chain). In accordance with the designated channel program, the channel $CH_1$ sends the disk control device 3 a write command, address information items consisting of cylinder No., track No., record No., etc., and data. In the disk control device 3, the microprocessor 6 controls the magnetic disk device 10 and writes the received data into a designated address in accordance with the command from the channel $CH_1$. This writing is carried out in, for example, a track unit. In writing the data, the microprocessor 6 writes "1" into both the corresponding renewal A field 22 and renewal B field 23 of the renewed cylinder management table in the control memory 7.

Figure 3:
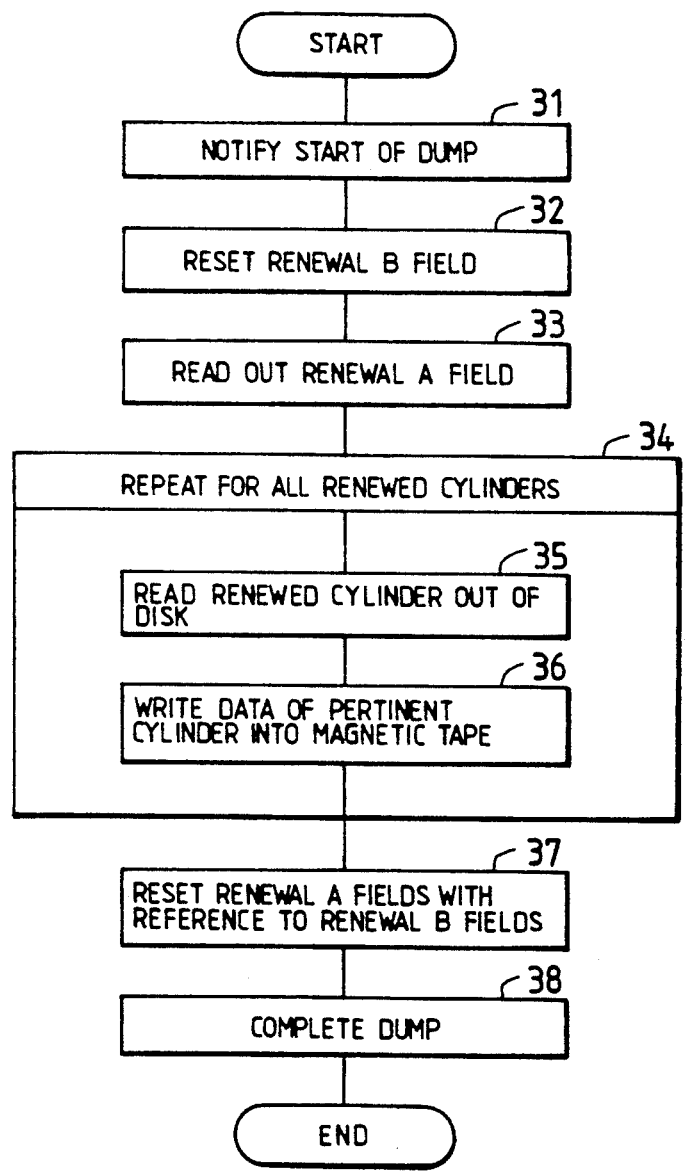
FIG. 3 is a flow chart of dump processing which is carried out in the system of FIG. 1.

Next, the dump operation will be described with reference to a flow chart in FIG. 3.

The dump processing should preferably be performed once or several times a day or once every several days though the rate differs depending also upon a management policy toward an external storage medium by a user and the data processing system of the user.

In starting the dump processing, the CPU 1 notifies the start of dumping to the disk control device 3 through the channel CH₁ (step 31). Upon receiving the notification, the microprocessor 6 in the disk control device 3 resets to "0" all the renewal B fields 23 of the renewed cylinder management table 20 in the control memory 7 (step 32). This is intended to make ready for the management of cylinders which might be renewed after the start of the dump processing. Subsequently, the CPU 1 requests the microprocessor 6 to read out the renewal A fields of the management table 20, and the microprocessor 6 responsively transfers the contents of the renewal A fields to the CPU 1 (step 33). The contents of the renewal A fields on this occasion indicate cylinders which were renewed between the issue of the notification of the start of the last dumping and that of the notification of the start of the current dumping.

The CPU 1 examines the received renewal A fields and dumps the contents of all the cylinders having "1" in the fields into the magnetic tape device 12 in succession (step 34). More specifically, the CPU 1 designates one of the cylinders of which the corresponding renewal A fields have "1", and it instructs the channel CH₁ to read out the data of the cylinder. The disk control device 3 receives the read instruction and the No. of the designated cylinder from the channel CH₁ and reads out the data of the corresponding cylinder from the magnetic disk device 10 through the device interface controller 9. The read data is temporarily stored in the data buffer 5 through the device interface controller 9, whereupon the data in the data buffer 5 is stored in the main memory 100 connected to the CPU 1 through the channel interface controller 4 as well as the channel CH₁ (step 35). Then, the microprocessor 6 reports the completion of the reading to the CPU 1.

Upon receiving the reading completion report, the CPU 1 starts the channel CH₄ this time and issues an instruction for writing the data of the corresponding cylinder in the main memory 100, into the magnetic tape device 12. Upon receiving the write instruction, the magnetic tape control device 11 drives the magnetic tape device 12 and writes into this magnetic tape device 12 the data of the corresponding cylinder in the main memory 100 as sent through the CPU 1 (step 36).

Via such series of steps, the data of the certain cylinder as to which the renewal A field of the management table 20 is endowed with "1" is written from the magnetic disk device 10 into the magnetic tape device 12, that is, it is dumped. This processing is repeated for all the cylinders as to which the corresponding renewal A fields of the management table 20 have "1".

In the interval of the dump processing described above, the operation of writing data, namely, renewing data, is sometimes carried out for any cylinder of the magnetic disk device 10. The renewal operation is usually performed each time the CPU 1 ends the processing of a certain job. In this case, the CPU 1 issues an input/output start instruction to the channel CH₁ and designates a channel program. The succeeding control operation is as stated before, and the microprocessor 6 in the disk control device 3 writes "1" into those renewal A and renewal B fields in the management table 20 which correspond to the cylinder to-be-renewed. With this operation, the data transferred from the CPU 1 is written into the corresponding cylinder in the magnetic disk device 10. In this way, the data renewal operation during the dump processing is performed.

Referring back to FIG. 3 illustrative of the dump processing, when the dumping of all the cylinders which have "1" in the renewal A fields of the management table 20 has been completed, the CPU 1 instructs the disk control device 3 to reset the renewal A fields. In response to the instruction, the microprocessor 6 resets the renewal A fields except those which have "1" in the corresponding renewal B fields (step 37). As a result, the renewal A fields of the cylinders which were renewed during the dump operation at the step 34 are held at "1", and the contents of these cylinders shall be dumped in the next dump processing. Thereafter, the CPU 1 notifies the completion of the dumping to the channel CH₁ and the disk control device 3 (step 38), whereby the dump processing ends. By the way, the next dump processing is executed similarly to the foregoing operation after, for example, one day or several hours.

Figure 4:
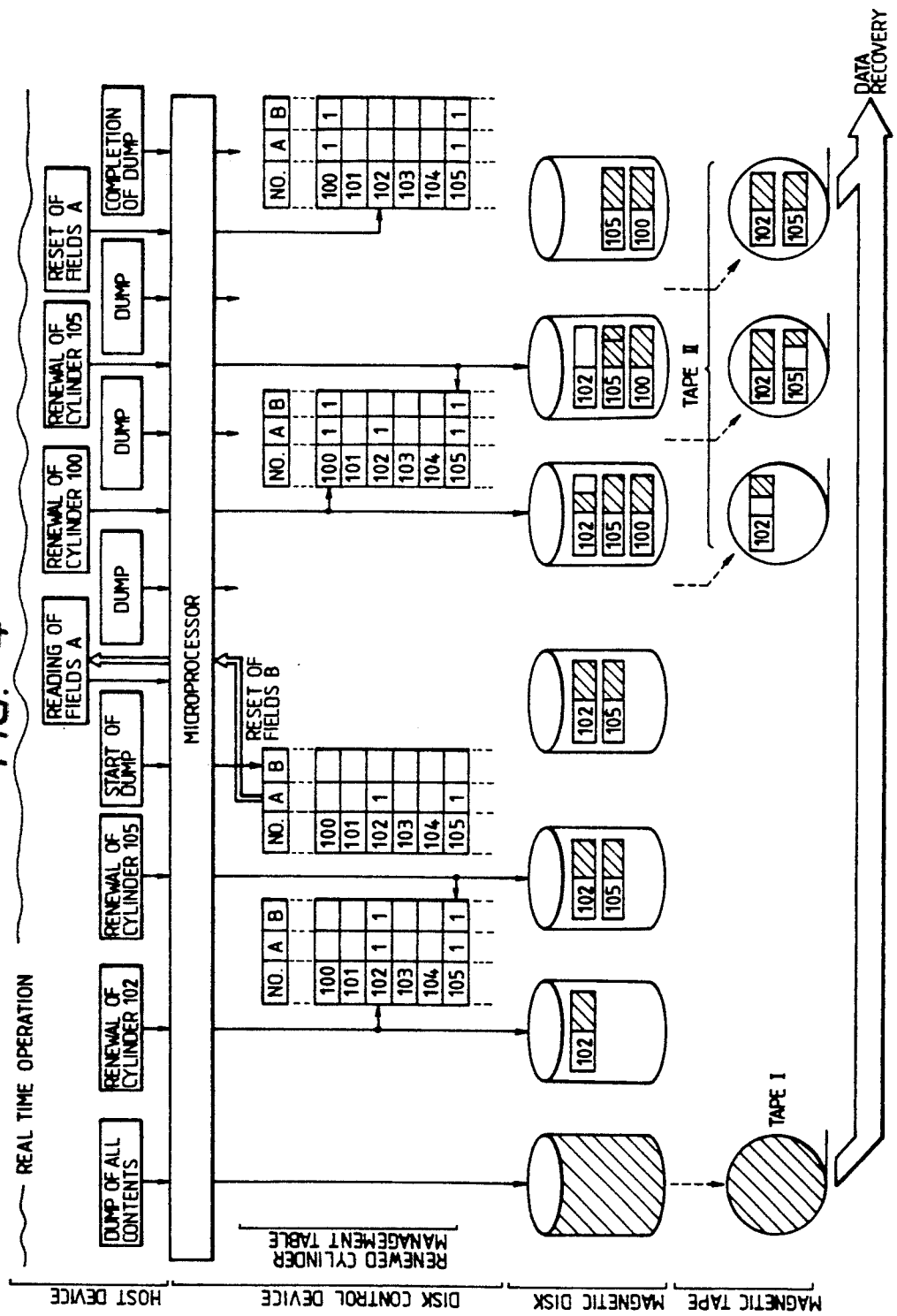
FIG. 4 is a diagram schematically showing an example of the sequence of data renewal and the dump processing which are carried out in the system of FIG. 1.

FIG. 4 shows an example of the sequence of dump processing which is executed under the on-line operation of the system described above. In the figure, an expression "host device" is a general name for the CPU 1 and the channels 2. In the first dump processing, all the contents of a magnetic disk are dumped onto a magnetic tape I. Thereafter, data on a cylinder 102 is renewed. Accordingly, the microprocessor 6 writes "1" into those renewal A and renewal B fields of the renewed cylinder management table in the control memory 7 which correspond to the cylinder 102. Further, data on a cylinder 105 is thereafter renewed, with the result that "1" is written into the renewal A field and renewal B field which correspond to the cylinder 105.

Soon, the microprocessor 6 is notified of the start of dumping through the channel CH₁ by the CPU 1, and it responsively resets all the renewal B fields. Subsequently, in compliance with the request of the CPU 1, the microprocessor 6 transfers the renewal A fields to the CPU 1 through the channel CH₁. The renewal A fields at this point of time hold "1" at positions corresponding to the cylinders 102 and 105 which underwent data renewals before. In accordance with the data of the transferred renewal A fields, the CPU 1 first starts dumping the data on the cylinder 102.

According to the present invention, the renewal of data is permitted even in the course of dump processing. In the illustrated example, while the data on the cylinder 102 is being dumped, data on a cylinder 100 is renewed as the result of proceeding real-time processing, and accordingly, "1" is written into the renewal A and renewal B fields corresponding to the cylinder 100. Still later, while the data on the cylinder 105 is being dumped, data on the same cylinder 105 is renewed, and accordingly, "1" is written anew into the renewal A and renewal B fields corresponding to the cylinder 105.

When dumping is started, data items corresponding to all the cylinders which are indicated by "1" of the renewal A fields transferred from the control memory 7 to the CPU 1 are dumped from the magnetic disk device onto the magnetic tape. Thereafter, when the dumping is ended, the CPU 1 instructs the disk control device 3 to reset the renewal A fields of the management table. In accordance with the instruction, the microprocessor 6 resets the renewal A fields except those which have "1" in the corresponding renewal B fields. In consequence, the renewal A fields corresponding to the cylinders 100 and 105 which underwent the data renewals during the dump processing remain without being reset. Subsequently, the microprocessor 6 in the disk control device 3 is notified of the completion of the dumping through the channel CH₁ by the CPU 1. At this point of time, the renewed cylinder management table signifies that the data items on the cylinders 100 and 105 must be added to the subject of the next dump processing. The next dump processing is executed onto a magnetic tape II, onto which the data items on the cylinders 102 and 105 are recorded for backup. The renewed data parts recorded on the magnetic tape II and all the older contents of the disk recorded on the magnetic tape I are merged, in other words, are compared and checked, whereby all the contents of the disk at the point of time at which the dumping onto the magnetic tape II was started can be recovered. Even if the data of the dumped position of the cylinder 105 is renewed during the dump processing, the renewed data is reliably dumped in the next dump processing.

The renewal A fields are reset for the first time by the reset instruction which the CPU 1 issues after acknowledging the completion of dumping. As a result, even if the dump processing is canceled or suspended midway due to any hindrance, the data items of the renewal A fields at the time of the suspension of the dump processing are conserved in the control memory 7. Accordingly, all the renewed data parts can be obtained without omission in such a way that dump processing is executed again by the use of the conserved data items. Furthermore, the control memory 7 is endowed with nonvolatility by the failsafe power source 8. Therefore, even if the power supply of the disk control device breaks down, the data items of the renewed cylinder management table in the control memory 7 are not lost.

The present invention is not restricted to the foregoing embodiment, but it can be variously modified within the scope of the purport thereof. By way of example, as regards the data of the renewal B fields, it suffices to identify data renewals which took place during the dump processing, specifically during an interval from the start of the transfer of the renewal A fields to the host device till the completion of the resetting of the renewal A fields. Accordingly, the operation of writing "1" into the renewal B fields, which is started immediately after the resetting of the renewal B fields in the foregoing embodiment, may well be started in response to the notification of the start of dumping and stopped in response to the notification of the completion of the dumping as a modification. Further, in this case, the resetting of the renewal B fields may well be done simultaneously with the stop of the operation of writing "1" thereinto.

Figure 5:
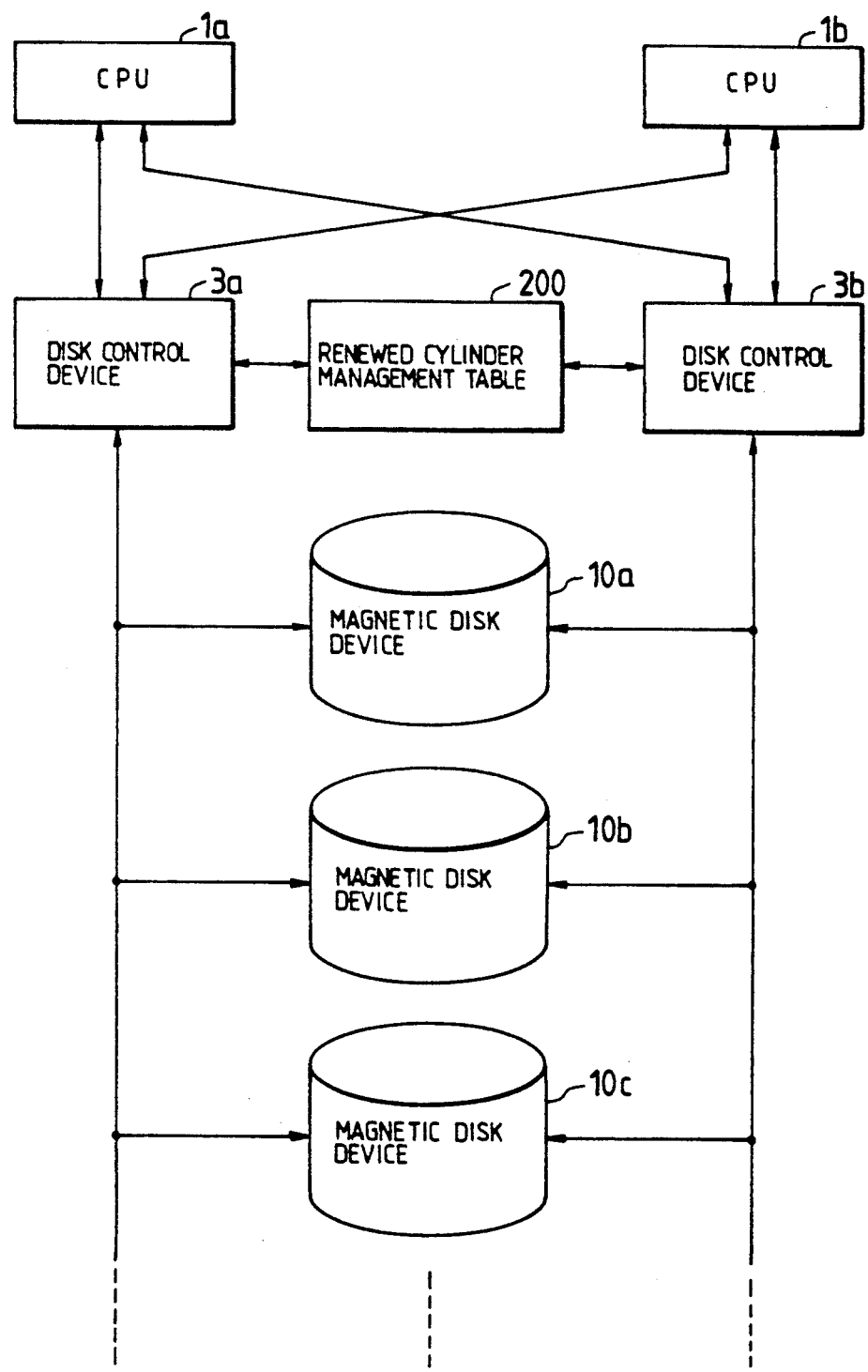
FIG. 5 is a block diagram of a system showing another embodiment of the present invention.

In a system wherein a group of magnetic disk devices are connected to a plurality of disk control devices in common, a renewed cylinder management table is shared by these disk control devices. FIG. 5 shows an example of such a system. A plurality of magnetic disk devices 10a, 10b, 10c, . . . are connected to two disk control devices 3a and 3b in common, and the disk control devices 3a and 3b are each connected to two CPUs 1a and 1b through unshown channels. Each of the CPUs can access any desired one of the magnetic disk devices through either of the disk control devices. By the way, although not especially shown, magnetic tape devices for dumping are prepared in correspondence with the magnetic disk devices 10a, 10b, 10c, . . .

The disk control devices 3a and 3b have respective control memories (not shown) which hold therein control information items other than a renewed cylinder management table 200. Further, the renewed cylinder management table 200 is held in a nonvolatile control memory. Here, the renewed cylinder management table 200 is constructed in correspondence with the disk devices 10a, 10b, 10c, . . . , in other words, the management table in FIG. 2 is constructed in disk device correspondence, and it is stored in the nonvolatile memory. When either of the disk control devices 3a and 3b has written data items into any of the magnetic disk devices 10a, 10b, 10c . . . , it accesses the control memory and writes "1" into the renewal A fields, and if necessary, renewal B fields of the corresponding management table of the renewed cylinder management table 200. Accordingly, whichever disk control device 3a or 3b is used for the execution of dump processing, the data items can be dumped from all renewed cylinders.

The renewed cylinder management table can adopt various formats. By way of example, in the table shown in FIG. 2, the cylinder No. fields 21 can be omitted if the respective cylinder Nos. and the addresses of the renewal A fields and renewal B fields corresponding thereto are in a fixed relationship. Alternatively, the Nos. themselves of renewed cylinders may well be written into the control memory without employing any table format. Moreover, whether or not dumping is necessary may well be managed by employing as a unit a proper area other than the cylinder, for example, a fixed data block such as a track, sector or record.

In each of the foregoing embodiments, part of the processing which is executed by the CPU 1 may well be carried out by the channel, or it may well be carried out by an input/output processing unit in a system having the input/output processing unit. In addition, the failsafe power source 8 can be dispensed with when a memory which is nonvolatile in itself, for example, a magnetic thin-film memory or a magnetic bubble memory is used as the control memory for storing the renewed cylinder management table.

Although, in the foregoing embodiments, data items on the magnetic disks are dumped onto the magnetic tapes, the present invention is also applicable to dumping from any other external memory, for example, a rewritable optical disk memory, onto any other storage medium, for example, a floppy disk.

We claim:

1. A backup control system in a data processing system, comprising:
    (a) at least one first memory which stores data therein;
    (b) at least one host device which performs data processing on data stored in said first memory to renew said data stored in said first memory, resulting in renewed data items as a consequence of said data processing;
    (c) at least one second memory in which said data stored in said first memory are stored as backup data;
    (d) a control memory which stores therein control information for managing renewal of the data in said first memory in units of a certain data block;
    (e) control means for storing first identifier information and second identifier information into said control memory as said control information for specified data blocks, the first identifier information indicating that a data renewal was performed on a specified data block in said first memory by said host device, the second identifier information indicating that the specified data block in said first memory was renewed during a period of time in which data from said first memory was copied into said second memory; and (f) means for clearing the first identifier information for specified data blocks from said control memory depending on the existence of second identifier information for those specified data blocks when the copying of the data from said first memory into said second memory has ended.

2. A backup control system in a data processing system as defined in claim 1, wherein said first memory is a magnetic disk device, said second memory is a magnetic tape device, and said host device is a central processing unit.

3. A backup control system in a data processing system as defined in claim 2, wherein said control memory is a nonvolatile memory which stores a management table formed by pairing the first identifier information and the second identifier information for respective units of a certain data block.

4. A backup control system in a data processing system as defined in claim 1 or 3, wherein said host device includes means for issuing an instruction in response to the end of the copying of the data from said first memory into said second memory, and the clearing means performs the clearing of the first identifier information from said control memory in response to the instruction.

5. A backup control system in a data processing system as defined in claim 1, comprising a control device which serves to control reading and writing of data from and into said first memory, and in which said control means said clearing means and said control memory are included.

6. A backup control system in a data processing system as defined in claim 3, comprising plural first memories and plural second memories, the respective first memories being held in a corresponding relationship with the second memories into which data in said first memories is copied, and the management tables being formed according to the corresponding relationship.

7. A backup control system in a data processing system as defined in claim 6, wherein said management tables are formed within a common control memory.

8. In a system having a first memory and a second memory for storing data, a method of backing up said system by dumping data from said first memory into said second memory, comprising the steps of:
(a) processing data stored in said first memory in units of a block of data so as to renew a specified block of data therein;
(b) storing in a table having entries for respective blocks of data stored in said first memory a first identifier indicating that a data renewal has been performed on the specified block of data in said first memory;
(c) initiating a dumping operation and transferring from said first memory to said second memory those blocks of data for which there exists the first identifier in said table;
(d) during said dumping operation, processing at least one block of data in said first memory and storing a second identifier in the entry for said one data block in said table; and
(e) at the end of said dumping operation, erasing all first identifiers in said table except those in entries which include the second identifier so that blocks of data indicated by the second identifiers are held in a non-dumped state.

9. A method according to claim 8, wherein each time a block of data in said first memory is processed to provide a renewed block of data, both a first identifier and a second identifier are stored in the entry for that data block in said table.

10. In a data processing system having a first memory and a second memory which store data, a dump control method wherein data in the first memory are copied into the second memory as backup data without stopping data processing, comprising:
(a) a first step of performing data processing on the data in said first memory and storing renewed data as a consequence of the data processing into said first memory, regardless of data copying from said first memory into said second memory;
(b) a second step of storing first identifier information for managing renewal of the data in said first memory in units of a predetermined block into a control memory, the first identifier information indicating that a data renewal has been performed on a specified block in said first memory;
(c) a third step of copying the renewed data in said first memory into said second memory in accordance with the first identifier information;
(d) a fourth step of storing second identifier information for managing renewal of the data in said first memory into said control memory during a period of time in which said third step is performed, the second identifier information indicating that a data renewal has been performed on a specified block in said first memory during the period of time in which said third step is performed; and
(e) a fifth step of controlling resetting of the first identifier information in said control memory in accordance with the second identifier information at the end of said fourth step so that the first identifier information for specified data blocks renewed during the period of time in which said third step is performed is held in a non-dumped state.

11. A dump control method as defined in claim 10, wherein said fifth step includes a step of clearing the first identifier information from said control memory in accordance with the second identifier information so that the first identifier information for the specified data blocks is held in the non-dumped state.

12. A dump control method as defined in claim 11, wherein said fourth step includes a step of ensuring that any second identifier information has been erased at the start of said third step, and a step of storing the second identifier information for identifying the same areas identified by the first identifier information into said control memory each time the first identifier information is stored at least during the period of time in which said third step is performed.

13. A dump control method as defined in claim 12, wherein the first identifier information and the second identifier information are specified values of first and second bits, respectively, at a location of said control memory corresponding to the area of said first memory where the data renewal was performed.

14. A dump control method as defined in claim 12 or 13, wherein said fifth step is executed according to a command which is issued by a host device for said first and second memories after the completion of the fourth step has been acknowledged.

* * * * *